(12) United States Patent
Chang

(10) Patent No.: US 9,025,322 B2
(45) Date of Patent: May 5, 2015

(54) KEY CONTROL DEVICE FOR CLICK PAD

(71) Applicant: Wistron Corporation, Taipei Hsien (TW)

(72) Inventor: Fang-Ta Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 288 days.

(21) Appl. No.: 13/834,436

(22) Filed: Mar. 15, 2013

(65) Prior Publication Data

US 2014/0104772 A1    Apr. 17, 2014

(30) Foreign Application Priority Data

Oct. 12, 2012    (TW) .............................. 101137568 A

(51) Int. Cl.
G06F 1/16    (2006.01)
(52) U.S. Cl.
CPC ................ *G06F 1/1662* (2013.01); *G06F 1/16* (2013.01); *G06F 1/1692* (2013.01); *G06F 1/169* (2013.01)
(58) Field of Classification Search
CPC ......... G06F 1/16; G06F 1/169; G06F 1/1662; G06F 1/1692

USPC ....................... 361/679.09; 345/174, 168, 176
See application file for complete search history.

(56) References Cited

U.S. PATENT DOCUMENTS

| | | | |
|---|---|---|---|
| 6,219,038 B1 * | 4/2001 | Cho .............................. | 345/173 |
| 7,880,731 B2 * | 2/2011 | Wang et al. .................... | 345/173 |
| 7,948,741 B2 * | 5/2011 | Fan .............................. | 361/679.1 |
| 8,456,437 B2 * | 6/2013 | Chiang et al. .................. | 345/173 |
| 8,803,852 B2 * | 8/2014 | Tsai et al. ...................... | 345/184 |

\* cited by examiner

*Primary Examiner* — Dion R Ferguson
*Assistant Examiner* — Mandeep Buttar
(74) *Attorney, Agent, or Firm* — Rosenberg, Klein & Lee

(57) ABSTRACT

The present disclosure relates to a key control device for click pad. The key control device is disposed below a click pad of a notebook computer, and comprises a frame and a sliding lever. The click pad is disposed at the frame. When a plurality of positioning parts of the sliding lever are interlocked with a plurality of locking parts of the frame, the frame and the click pad cannot have up-and-down movements and thus shutting down the key functions of the click pad. When the plurality of positioning parts of the sliding lever are not interlocked with the plurality of locking parts of the frame, the frame and the click pad can have up-and-down movements and thus activating the key functions of the click pad. Thereby, the key control device according to the present disclosure can control the activation or shutdown of the key functions of the click pad.

21 Claims, 17 Drawing Sheets

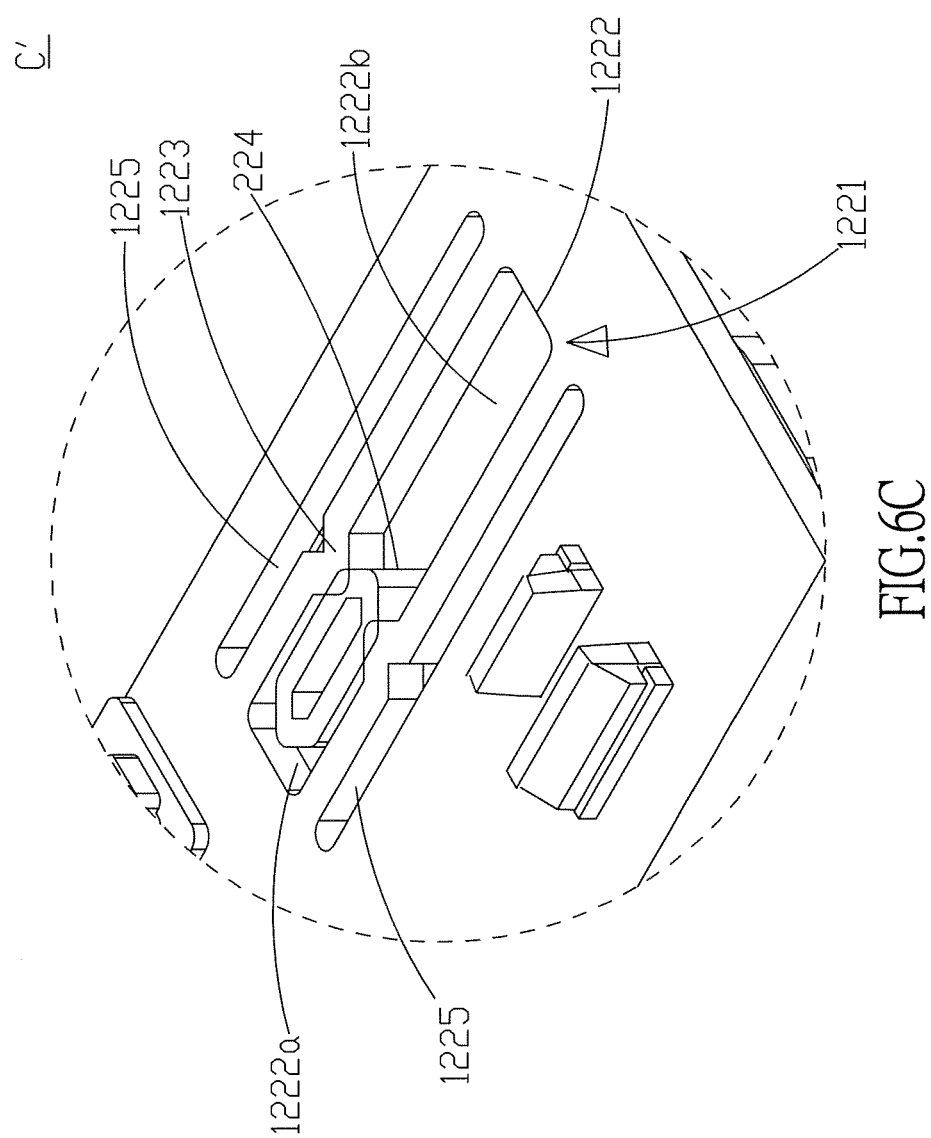

KEY CONTROL DEVICE FOR CLICK PAD

FIELD OF THE DISCLOSURE

The present disclosure relates generally to a control device for click pad, and particularly to a key control device for the click pad on notebook computers.

BACKGROUND OF THE DISCLOSURE

With rapid advancement of technologies, modern electronic products are fast developing, and thus bringing people great convenience and improving their living qualities. This is especially true for the portable electronic products paying attention on compactness and lightness, for example, notebook computer, personal digital assistants, and mobile phones. Most current electronic products requiring input information need input devices such as keyboards and mice. Because the input devices described above do not comply with the development trend of simplicity and lightness, a new-generation input device, touch pad, has been widely applied to various electronic products for replacing the original input devices. A touch pad has a touch region corresponding to the display area of the display of the electronic product. Thereby, by sliding or touching the touch region of the touch pad using his finger or a stylus, a user can operate all the functional icons displayed on the display of the electronic product and hence controlling the electronic product to execute the corresponding functions.

The touch pad according to prior art has the touch functions of moving cursor and controlling windows only. A current touch pad already has the key functions equivalent to the left and right keys of a mouse. Nonetheless, when a user uses the touch functions of a click pad for browsing, he could possibly press the click pad and activate the key functions falsely, resulting in interruption of browsing.

Accordingly, the present disclosure provides a key control device for click pad. By using the key control device according to the present disclosure, the key functions of the click pad can be shut down or activated for avoiding activating the key functions of the click pad falsely during browsing using the touch functions of the click pad on a notebook computer and interrupting the browse.

SUMMARY

An objective of the present disclosure is to provide a key control device for click pad applicable to a click pad of a notebook computer and controlling the activation or shutdown of the key functions of the click pad. While using the touch functions of the click pad only, the key functions of the click pad can be shut down temporarily for avoiding activating the key functions of the click pad falsely while using the touch functions of the click pad.

The present disclosure provides a key control device for click pad disposed in a keyboard housing of a notebook computer and corresponding to a click pad. The key control device comprises a frame and a sliding lever. The frame is disposed at an opening of the keyboard housing and has a first surface and a second surface. The click pad is disposed on the first surface and located outside the keyboard housing. The frame has a main body and a plurality of locking parts. The plurality of locking parts are disposed on the periphery of the main body. The sliding lever is disposed inside the keyboard housing and sliding on the second surface of the frame. The lever has a plurality of positioning parts corresponding to the plurality of locking parts for controlling the key functions of the click pad.

BRIEF DESCRIPTION OF THE DRAWINGS

FIG. 6C shows a partially enlarged view of the C' region in FIG. 6A according to the present disclosure;

DETAILED DESCRIPTION

In order to make the structure and characteristics as well as the effectiveness of the present disclosure to be further understood and recognized, the detailed description of the present disclosure is provided as follows along with embodiments and accompanying figures.

The click pad on a notebook computer according to prior art has the touch functions of moving cursor and controlling windows and the key functions equivalent to the left and right keys of a mouse. Nonetheless, when a user uses the touch functions of a click pad for browsing, he could possibly press the click pad and activate the key functions falsely, resulting in interruption of browsing. Accordingly, the present disclosure provides a key control device for click pad. By using the key control device according to the present disclosure, the key functions of the click pad can be shut down or activated for avoiding activating the key functions of the click pad falsely during browsing using the touch functions of the click pad on a notebook computer and interrupting the browse.

Figure 1:
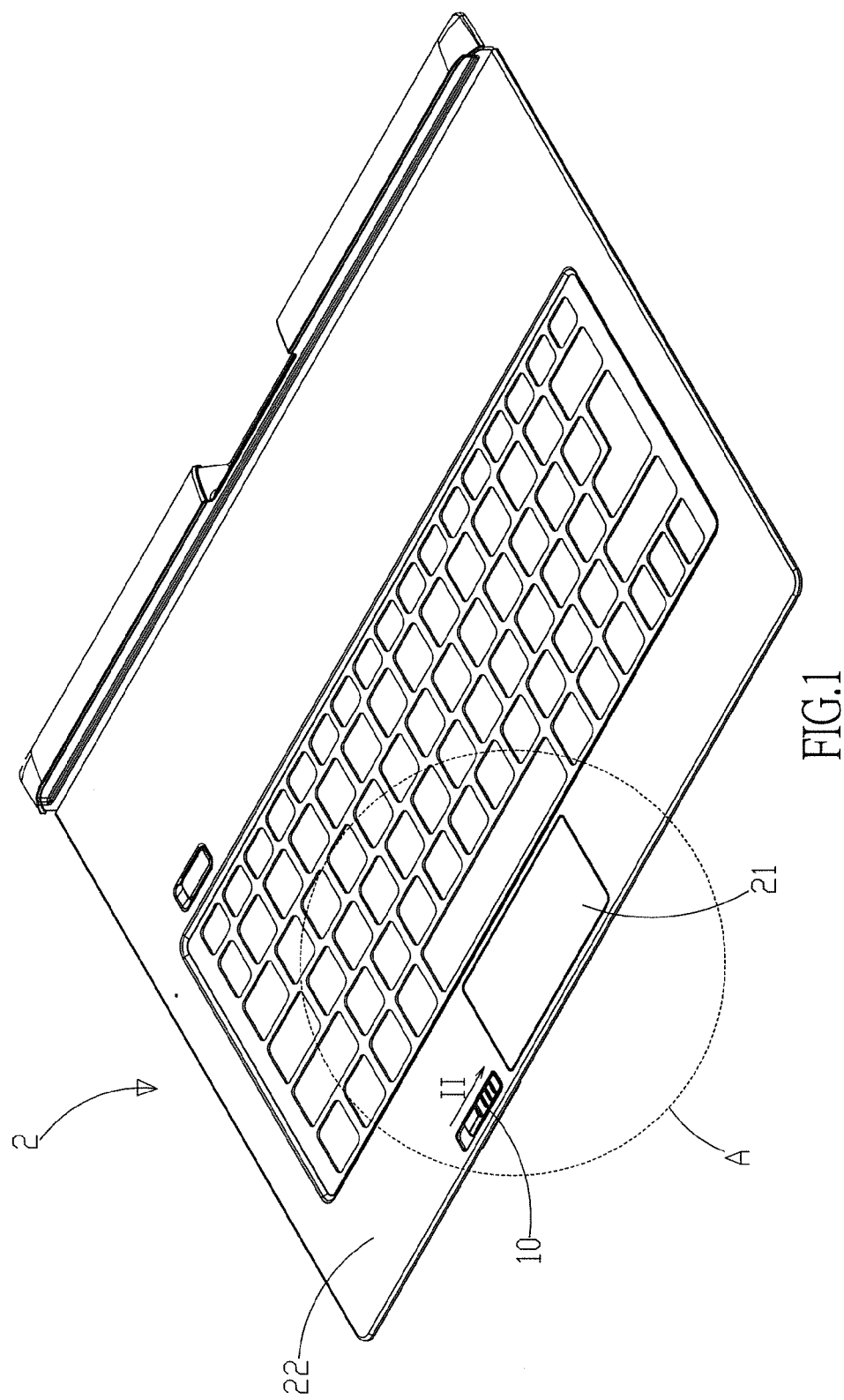
FIG. 1 shows an exterior view of the click pad according the first embodiment of the present disclosure.

FIGS. 1, 2, 3, and 4A show an exterior view the click pad, exploded views of the A region of the key control device in FIG. 1, and a usage status diagram of the key control device according a first embodiment of the present disclosure. As shown in the figures, the present embodiment provides a key control device 1, which mainly controls the activation or shutdown of the key functions of a click pad 21 of a notebook computer 2. The key control device 1 according to the present embodiment is disposed and hidden below the click pad 21 of the notebook computer 2, as the A region in FIG. 1. The key control device 1 has a switch 10 exposed to the notebook computer 2. A user only needs to switch the switch 10 for controlling the action of the key control device 1 and hence further controlling the activation or shutdown of the key functions of the click pad 21.

The notebook computer 2 has a keyboard housing 22; the keyboard housing 22 has an opening 221; the opening 221 penetrates from the outside of the keyboard housing 22 to the inside thereof. The key control device 1 according to the present embodiment is disposed in the opening 221 of the keyboard housing 22 and comprises a frame 11 and a sliding lever 12. The frame 11 is disposed at the opening 221 and has a first surface 111 and a second surface 112. The first surface 111 faces to the outside of the keyboard housing 22; the second surface 112 faces to the inside of the keyboard housing 22. The click pad 21 is disposed on the first surface 111 of the frame 11 and held in the opening 221. The click pad 21 is exposed to the outside of the keyboard housing 22 so that the click surface 211 of the click pad 21 for a user is exposed to the outside of the keyboard housing 22. The sliding lever 12 is disposed inside the keyboard housing 22 and sliding on the second surface 112 of the frame 11.

The frame 11 comprises a main body 113 and two locking parts 114. The locking parts 114 are disposed on the periphery of the main body 113. The two locking parts 114 according to the present embodiment are disposed on the left and right sides of the main body 113 and include a locking hole 1140, respectively. The sliding lever 12 has a first end 121 and a second end 122. The first and second ends 121, 122 of the sliding lever 12 have a positioning part 123, respectively. The two positioning parts 123 are disposed at the two corresponding locking parts 114 on the left and right sides of the main body 113, respectively. The two positioning parts 123 according to the present embodiment are hooks 1230, respectively. The two hooks 1230 can pass through the two corresponding locking holes 1140. The hook parts of the two hooks 1230 according to the present embodiment face to the same direction, namely, to the right according to the viewing angle of FIG. 4A.

Figure 4A:
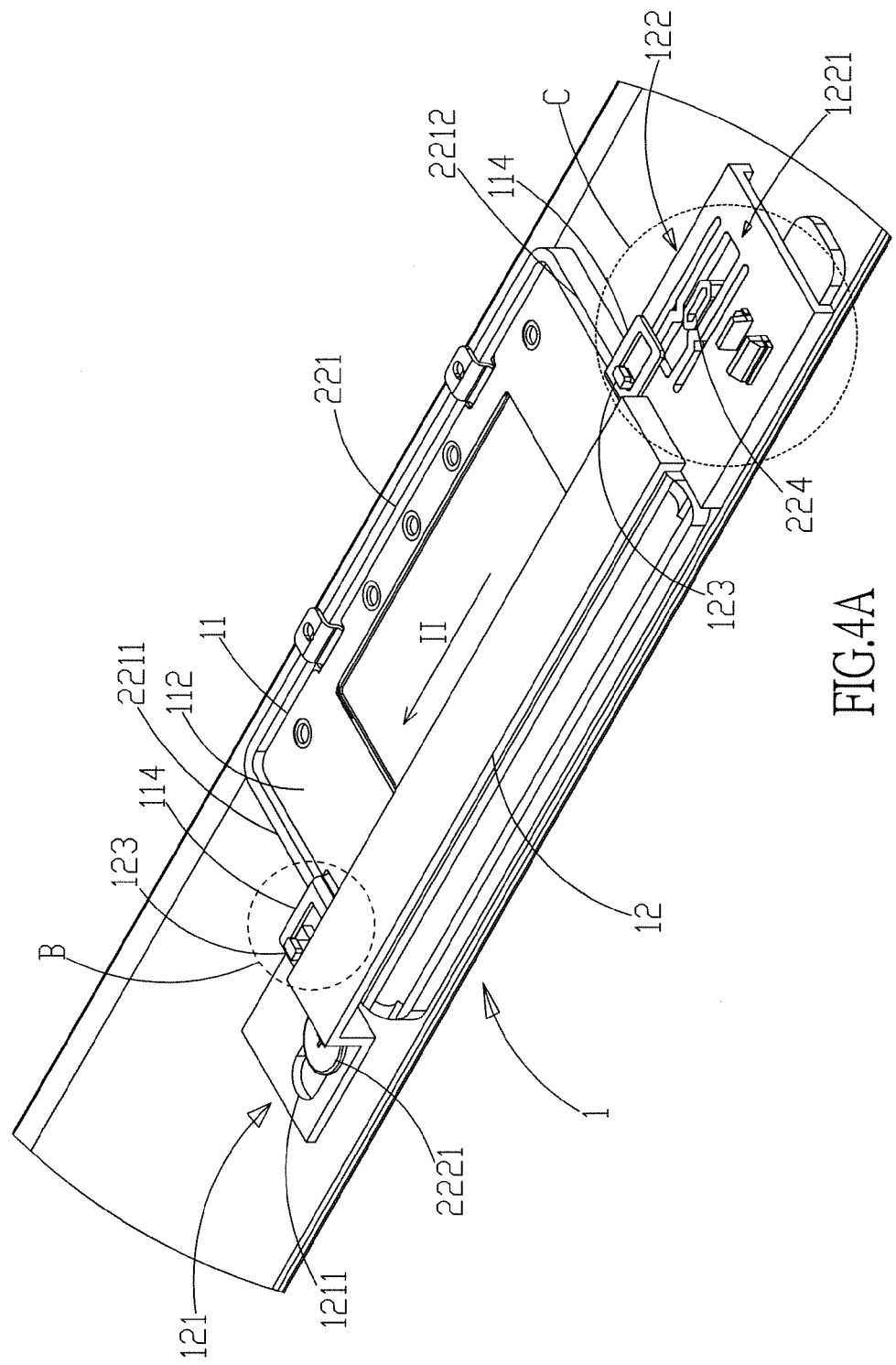
FIG. 4A shows a usage status diagram of the key control device according to the first embodiment of the present disclosure.
Figure 4B:
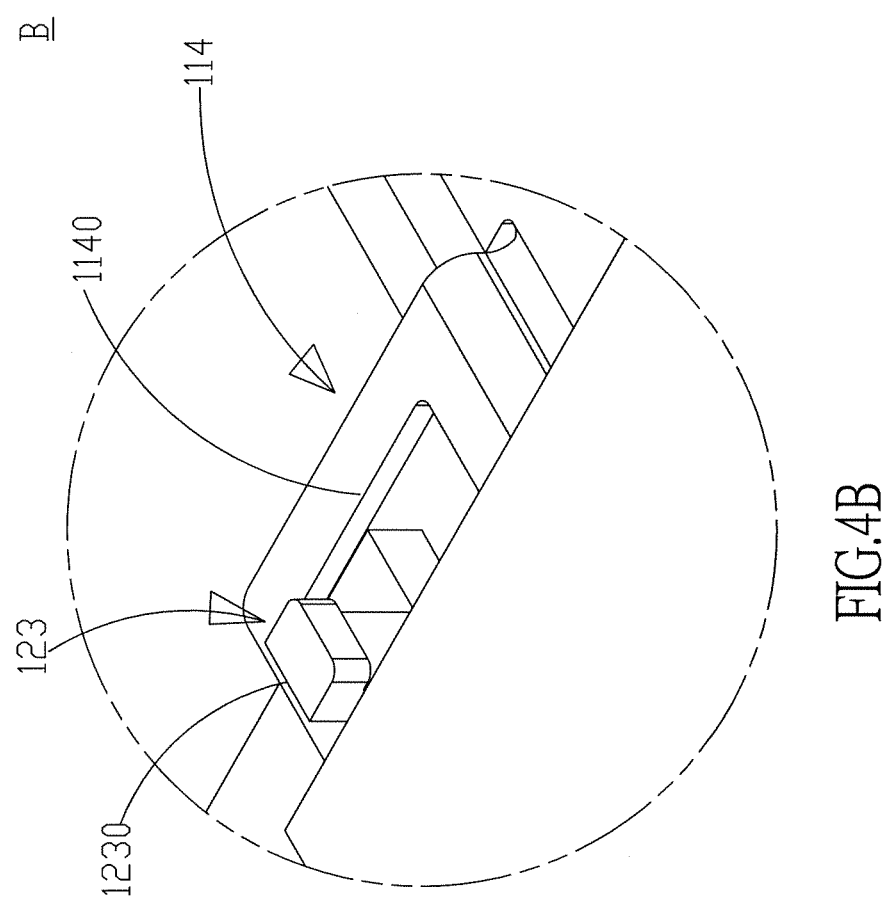
FIG. 4B shows a partially enlarged view of the B region in FIG. 4A according to the present disclosure.
Figure 6A:
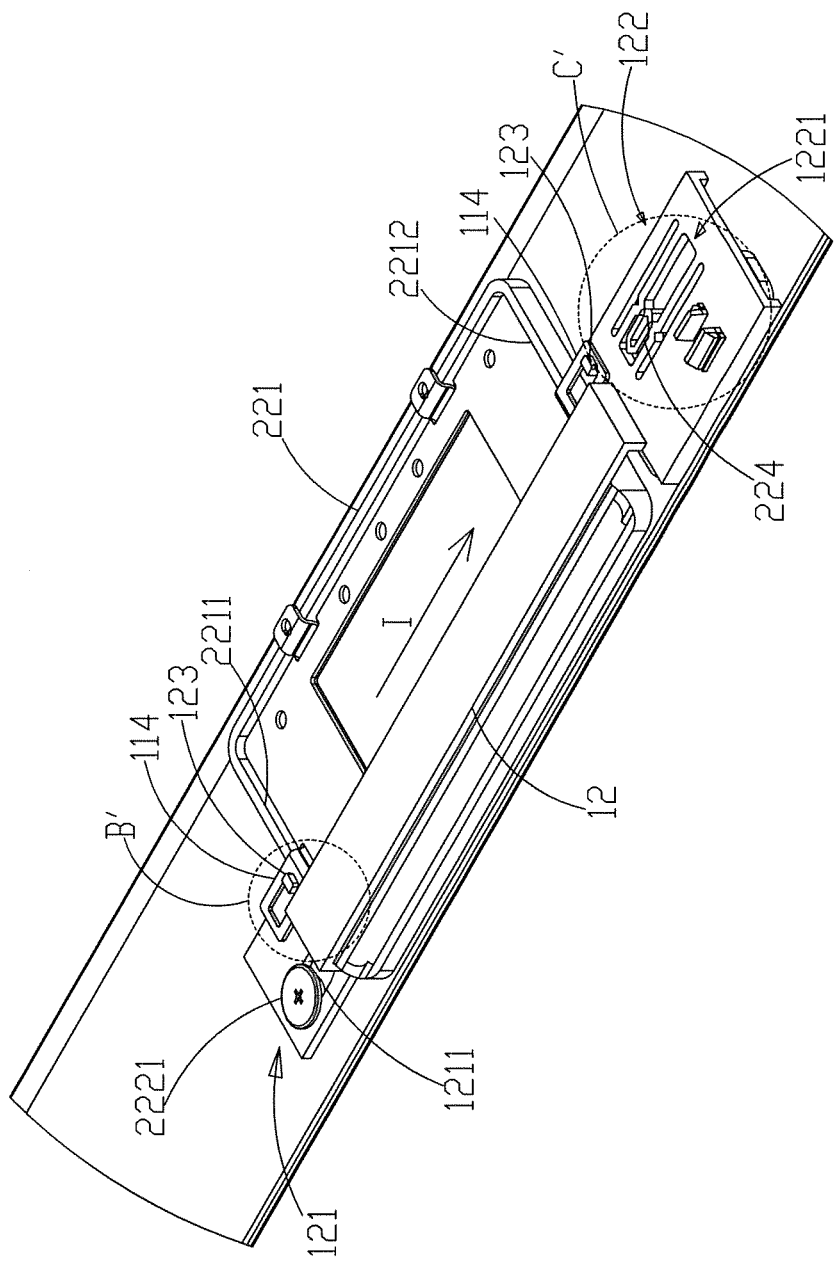
FIG. 6A shows another usage status diagram of the key control device according to the first embodiment of the present disclosure.
Figure 6B:
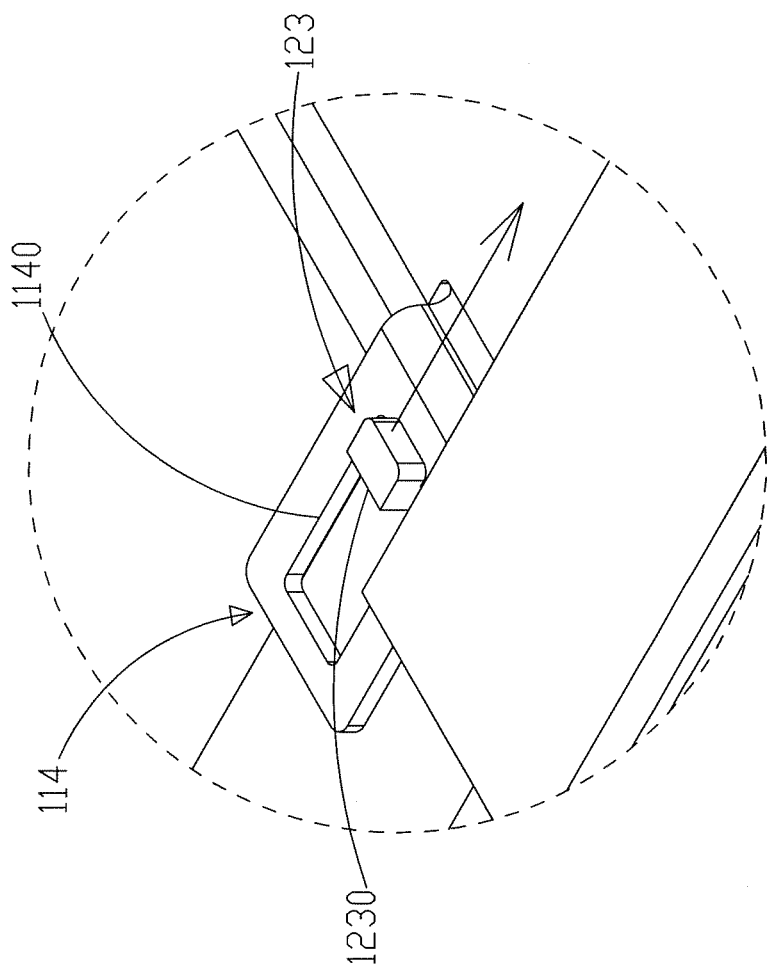
FIG. 6B shows a partially enlarged view of the B' region in FIG. 6A according to the present disclosure.

When the two hooks 1230 lock to the sidewalls of the two locking holes 1140, as shown in FIG. 6B, the frame 11, and hence the clock pad 21, which is driven by the frame 11, cannot move up-and-down. Then the key functions of the clock pad 21 cannot function, which is equivalent to shutdown of the key functions of the click pad 21. When the two hooks 1230 does not lock to the sidewalls of the two locking holes 1140, as shown in FIG. 4B, the frame 11 can move up-and-down freely. Thereby, the click pad 21 disposed on the frame 11 can move up-and-down as well, which means that the key functions of the clock pad 21 can function normally. Accordingly, key functions of the click pad 21 are equivalently activated.

Refer again to FIGS. 3 and 4A. The sliding lever 12 according to the present embodiment is disposed on the inside of the keyboard housing 22 and sliding on the second surface 112 of the frame 11. For avoiding the sliding lever 12 coming off the second surface 112 of the frame 11, the keyboard housing 22 further has a first limiting part 222 and a second limiting part 223. The opening 221 has a first side 2211 and a second side 2212 corresponding to the first side 2211. The first limiting part 222 is adjacent to the first side 2211 of the opening 221; the second limiting part 223 is adjacent to the second side 2212 of the opening 221. Nonetheless, the first end 121 of the sliding lever 12 is disposed at the first limiting part 222; the second end 122 of the sliding lever 12 is disposed at the second limiting part 223. Thereby, the first and second limiting parts 222, 223 fix the sliding lever 12 to the inside of the keyboard housing 22. They also limit the sliding lever 12 to slide on the second surface 112 of the frame 11 and thus avoiding coming off.

The first limiting part 222 according to the present embodiment includes a limiting pillar 2221. The first end 121 of the sliding lever 12 includes a limiting channel 1211. The limiting pillar 2221 passes through the limiting channel 1211. The length of the limiting channel 1211 is the distance the sliding pillar 12 can travel. Thus, the traveling range of the sliding lever 12 is limited. The diameter of the top of the limiting pillar 2221 is greater than the width of the limiting channel 1211 for avoiding the first end 121 of the sliding lever 12 coming off the first limiting part 222. The second limiting part 223 according to the present embodiment has two limiting trenches 2231. The second end 122 of the sliding lever 12 has a pushing part, which is the switch 10 described above. The switch 10 has two connecting projecting parts 101 passing through the two corresponding limiting trenches, respectively. The two connecting projecting parts 101 are disposed in the two connecting holes 1220 on the second end 122 of the sliding lever 12. The switch 10 is exposed to the outside of the keyboard housing 22 for the convenient use of the user. The second limiting part 223 further includes a holding trench 2232. The two limiting trenches 2231 are disposed in the holding trench 2232. The hold trench 2232 is used for holding the switch 10. The two connecting projecting parts 101 of the switch 1 pass through the two limiting trenches 2231 disposed at the bottom of the holding trench 2232. Thereby, the switch 10 will not protrude to the outside of the keyboard housing 22 and hence enhancing appearance of the notebook computer 2.

Figure 2:
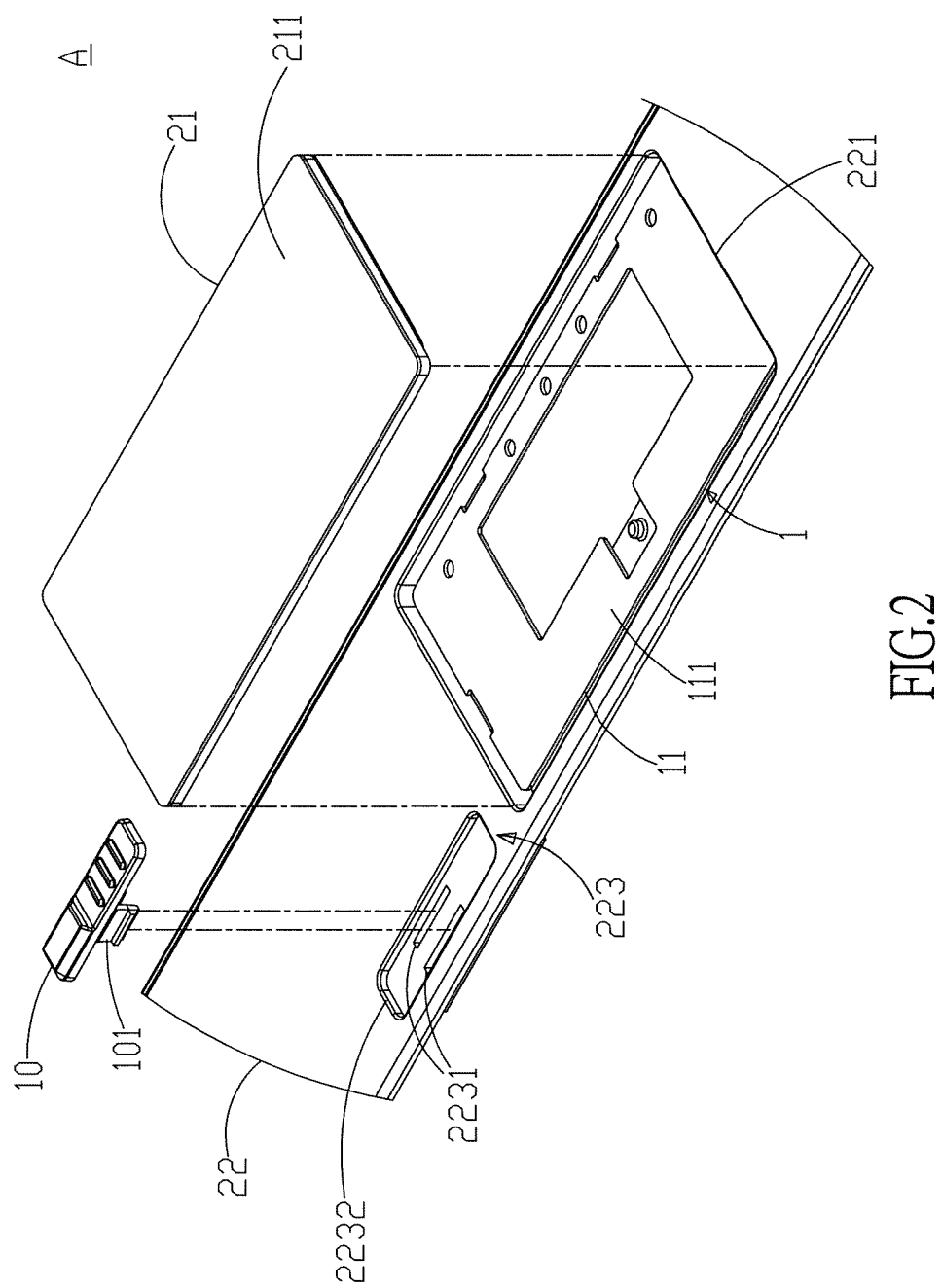
FIG. 2 shows an exploded view of the A region of the key control device in FIG. 1 according to the present disclosure.
Figure 3:
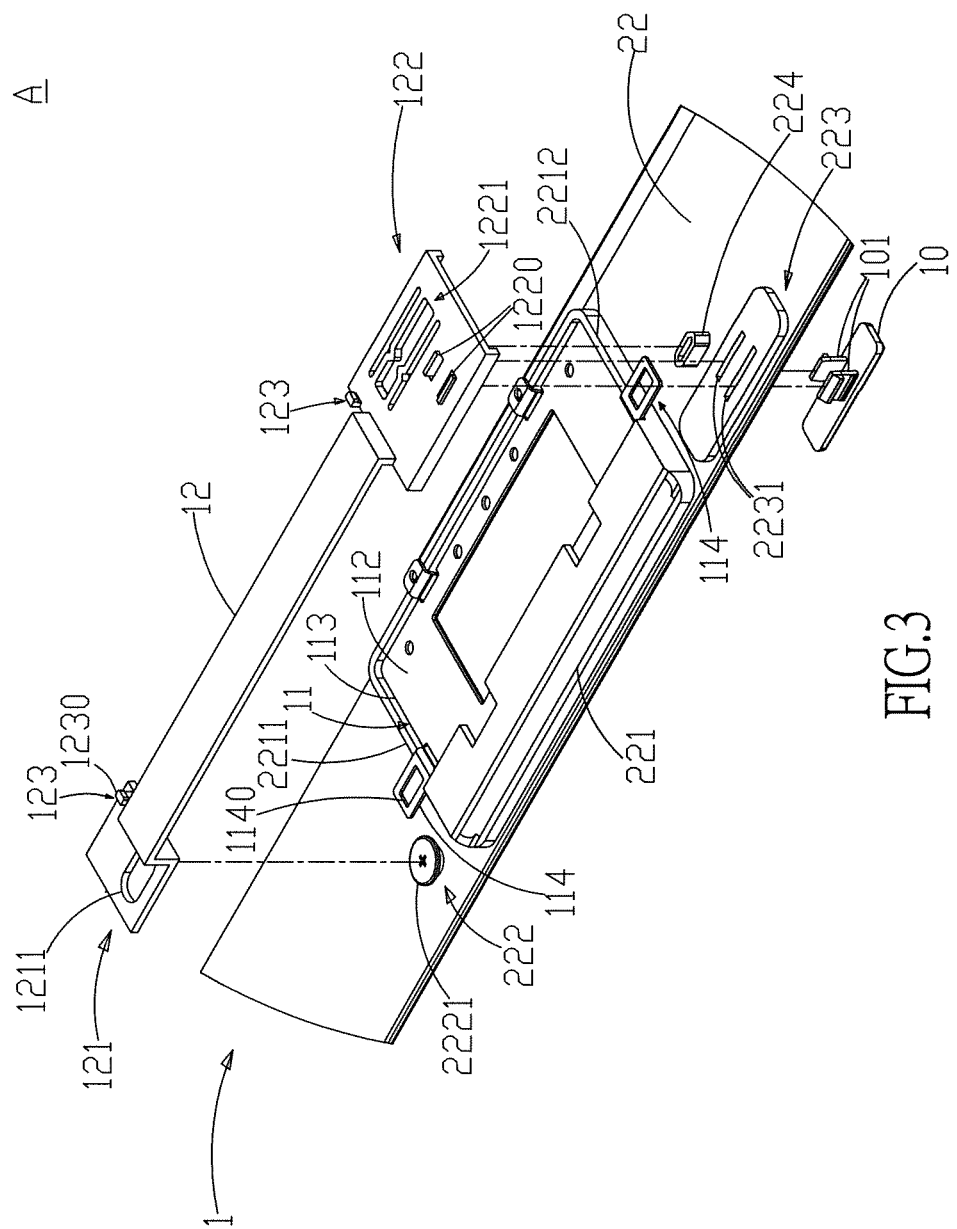
FIG. 3 shows another exploded view of the A region of the key control device in FIG. 1 according to the present disclosure.
Figure 5:
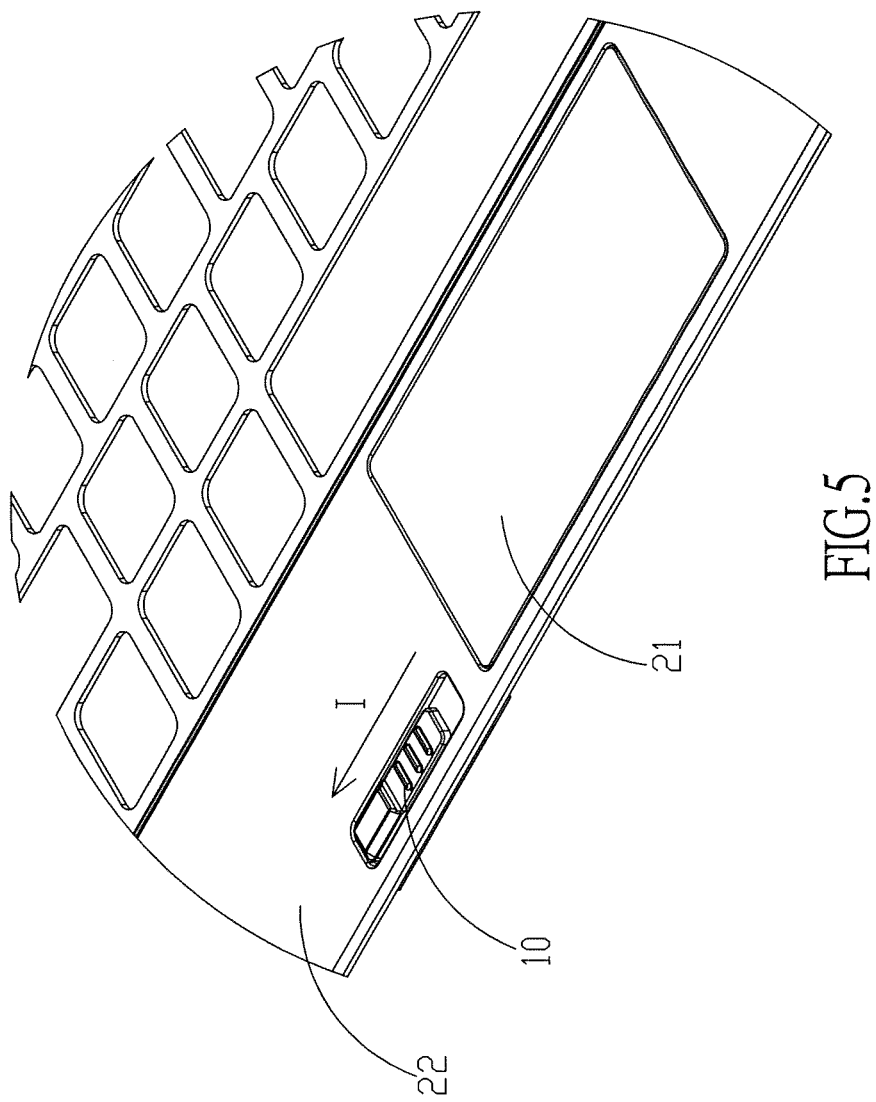
FIG. 5 shows another exterior view of the click pad according the first embodiment of the present disclosure.

FIG. 5 and FIGS. 6A to 6C show another usage status diagram and partially enlarged views of the B' and C' regions of the key control device according to the first embodiment of the present disclosure. As shown in the figure, when the user pushes the switch 10 toward a first direction I, the switch 10 drives the sliding lever 12 to move toward the first direction I. In the following, FIG. 6A will be used for description. The viewing angle of FIG. 6A is different from that of FIG. 5. Thereby, the direction of the arrow in FIG. 5 is opposite to that in FIG. 6A; both represent the first direction I. When the switch 10 drives the sliding lever 12 to move toward the first direction I, the first end 121 of the sliding lever 12 moves toward the first direction I relative to the first limiting part 222 located on the first side 2211 of the opening 221 to make the limiting pillar 2221 located on the left side of the limiting channel 1211. The two hooks 1230 of the two positioning parts 123 of the sliding lever 12 lock to the two locking holes 1140 of the two locking parts 114 of the frame 11, respectively, as shown in FIG. 6B. Thereby, the sliding lever 12 fixes the frame 11, disabling the frame 11 to move up-and-down. Consequently, the click pad 21 cannot move up-and-down with the frame 11 and the key functions of the click pad 21 cannot function normally. At this time, if the user presses the click surface 211 of the click pad 21, as shown in FIG. 2, because the click pad 21 cannot move up-and-down, the key functions of the click pad 21 will not be activated.

Refer again to FIGS. 1 and 4A. As the user pushes the switch 10 toward a second direction II, as shown in FIG. 1, the switch 10 drives the sliding lever 12 to move toward the second direction II. In the following, FIG. 4A will be used for description. The viewing angle of FIG. 4A is different from that of FIG. 1. Thereby, the direction of the arrow in FIG. 1 is opposite to that in FIG. 4A; both represent the second direction II. When the switch 10 drives the sliding lever 12 to move toward the second direction II, the first end 121 of the sliding lever 12 moves toward the second direction II relative to the first limiting part 222 located on the first side 2211 of the opening 221 to make the limiting pillar 2221 located on the right side of the limiting channel 1211. The two hooks 1230 of the two positioning parts 123 of the sliding lever 12 cannot lock to the two locking holes 1140 of the two locking parts 114 of the frame 11, respectively, as shown in FIG. 4B. Thereby, the sliding lever 12 cannot fix the frame 11, enabling the frame 11 to move up-and-down. Consequently, the click pad 21 can move up-and-down with the frame 11 and the key functions of the click pad 21 can function normally. At this time, if the user presses the click surface 211 of the click pad 21, as shown in FIG. 2, because the click pad 21 can move up-and-down, the key functions of the click pad 21 will be activated.

Figure 4C:
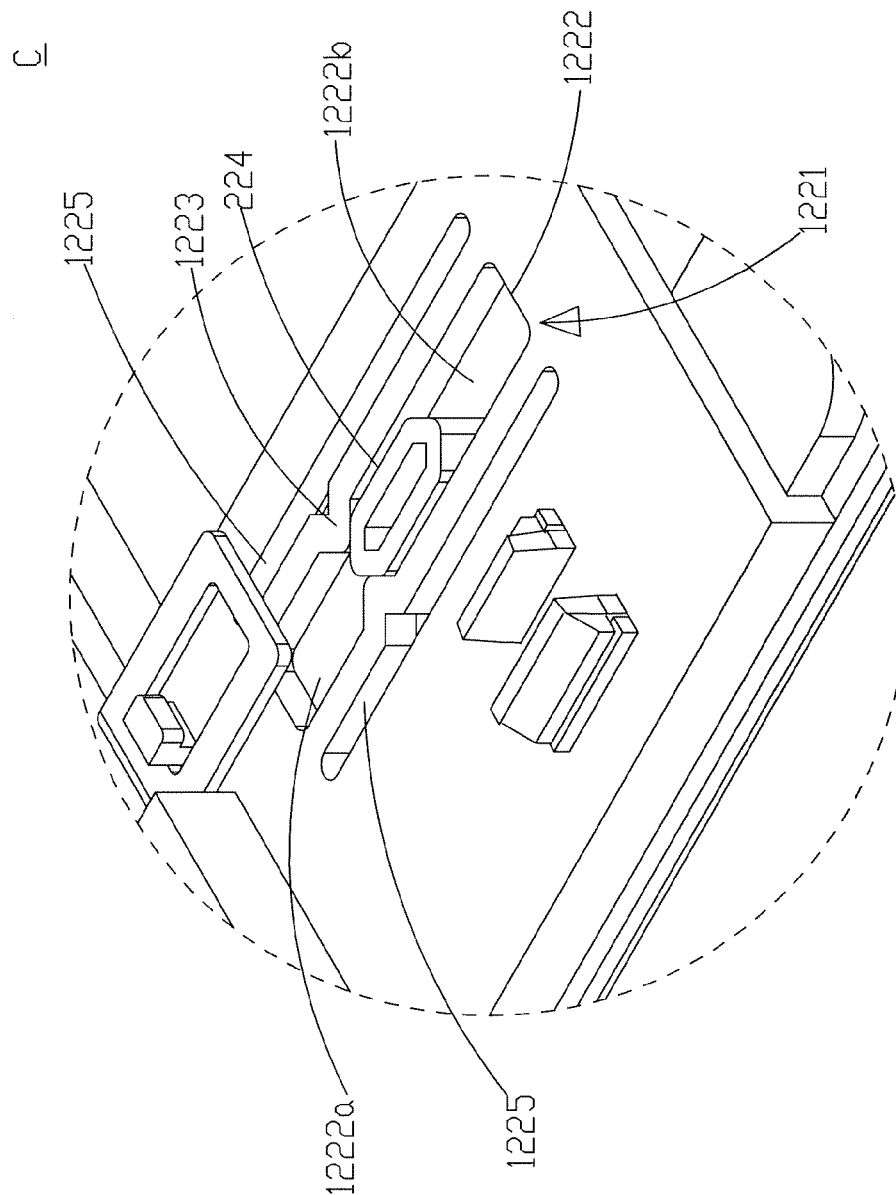
FIG. 4C shows a partially enlarged view of the C region in FIG. 4A according to the present disclosure.

Refer again to FIG. 3. The keyboard housing 22 according to the present embodiment further includes a positioning pillar 224 near the second side 2212 of the opening 221 and located above the second limiting part 223. The second end 122 of the sliding lever 12 has a third limiting part 1221 corresponding to the positioning pillar 224. Refer to FIG. 4C. The third limiting part 1221 according to the present embodiment includes a trench 1222. The positioning pillar 224 passes through the trench 1222. The trench 1222 further has two blocking parts 1223 disposed on the sidewalls of the trench 1222 and corresponding to each other. The two blocking parts 1223 divide the trench 1222 into a limiting part 1222a and a free part 1222b. The limiting part 1222a can just hold the positioning pillar 224.

Refer again to FIG. 4A and FIG. 6A. In the following, the view angle of FIGS. 4A and 6A will be used for description. When the sliding lever 12 moves toward the first direction I, as shown in FIG. 6A, the trench 1222 moves toward the first direction I. After the two locking parts 114 of the frame 11 lock to the two positioning parts 123 of the sliding lever 12, the positioning pillar 224 will be located in the limiting part 1222a of the trench 1222, as shown in FIG. 6C. The positioning part 224 is blocked by the two blocking parts 1223, making it unable to eject from the limiting part 1222a freely. The user needs to push the sliding lever 12 for ejecting the positioning pillar 224 from the limiting part 1222a. Thereby, the locking part 114 and the positioning part 123 can lock to each other firmly; when the key functions of the click pad 21 are shut down, it is sure that the click pad 21 cannot move up-and-down.

In order to activate the key functions of the click pad 21, the user pushes the sliding lever 12 toward the second direction II, as shown in FIG. 4A. At this time, the trench 1222 has the force for moving toward the second direction II. This force is greater than the force of the two blocking parts 1223 for blocking the positioning pillar 224. When the trench 1222 moves toward the second direction II, the positioning pillar 224 escapes from the limiting part 1222a and moves to the free part 1222b. Thereby, the two locking parts 114 escapes from the two positioning parts 123 and will not lock to each other. The frame 11, and hence the click pad 21, can have up-and-down movement, which means activation of the key functions of the click pad 21. Besides, the positioning pillar 224 is blocked by the two blocking parts 1223, preventing it from entering the limiting part 1222a freely. Consequently, the key functions of the click pad 21 can be maintained in the activated status.

The third limiting part 1221 described above further comprises two auxiliary trenches 1225 located on both sides of the trench 1222, respectively, and parallel to the trench 1222, thus making the sidewalls of the trench 1222 flexible. When the sliding lever 12 moves along the trench 1222, the two blocking parts 1223 contacts the positioning pillar 224. Thanks to the flexibility of the sidewalls of the trench 1222, the sidewalls can expand toward the two auxiliary trenches 1225, and hence making the trench to move smoothly, which, in turn, makes the sliding lever 12 to slide smoothly.

Figure 7:
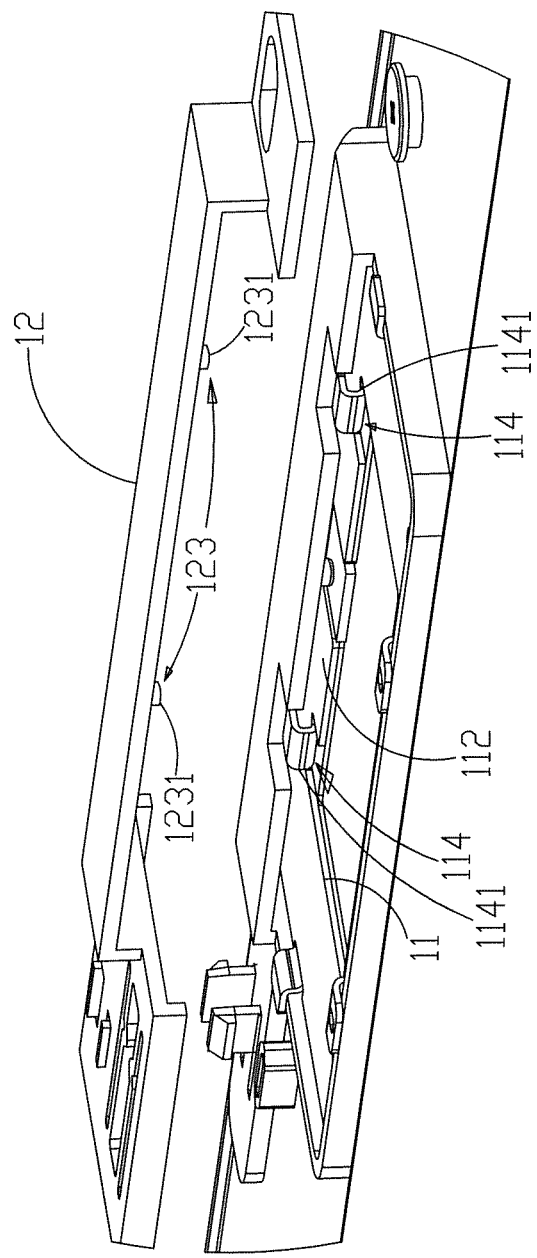
FIG. 7 shows an exploded view of the click pad according the second embodiment of the present disclosure.

FIG. 7 shows an exploded view according the second embodiment of the present disclosure. As shown in the figure, the difference between the present embodiment and the previous one is that the structures of the two locking parts 114 and two positioning parts 123 according to the present embodiment are different from the one according to the previous embodiment. The two locking parts 114 according to the present embodiment are disposed at the bottom of the main body 113. In addition, each locking part 114 is a projecting part 1141 extending upwards from the second surface 112 of the frame 11. The projecting part 1141 according to the present embodiment is a folded structure, which means that the projecting part 1141 is elastic. The two positioning parts 123 of the sliding lever 12 are disposed corresponding to the two locking parts 114 with each positioning part 123 being a push pillar 1231.

Figure 8A:
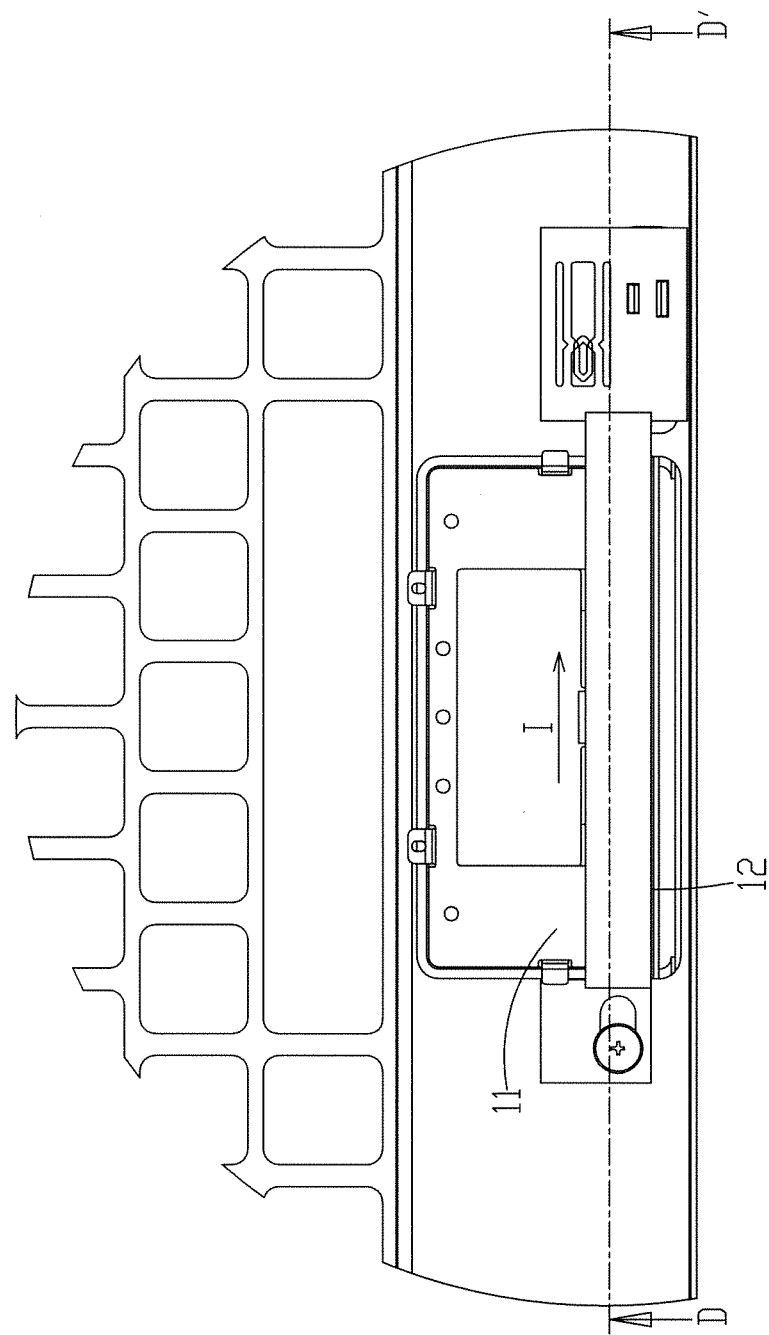
FIG. 8A shows a usage status diagram of the key control device according to the second embodiment of the present disclosure.
Figure 8B:
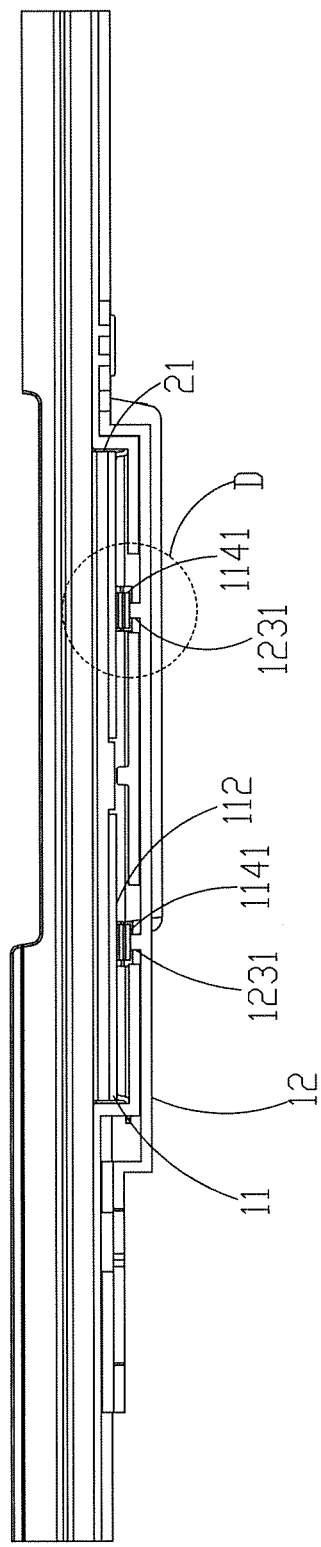
FIG. 8B shows a cross-sectional view along the DD' direction in FIG. 8A according to the present disclosure.
Figure 8C:
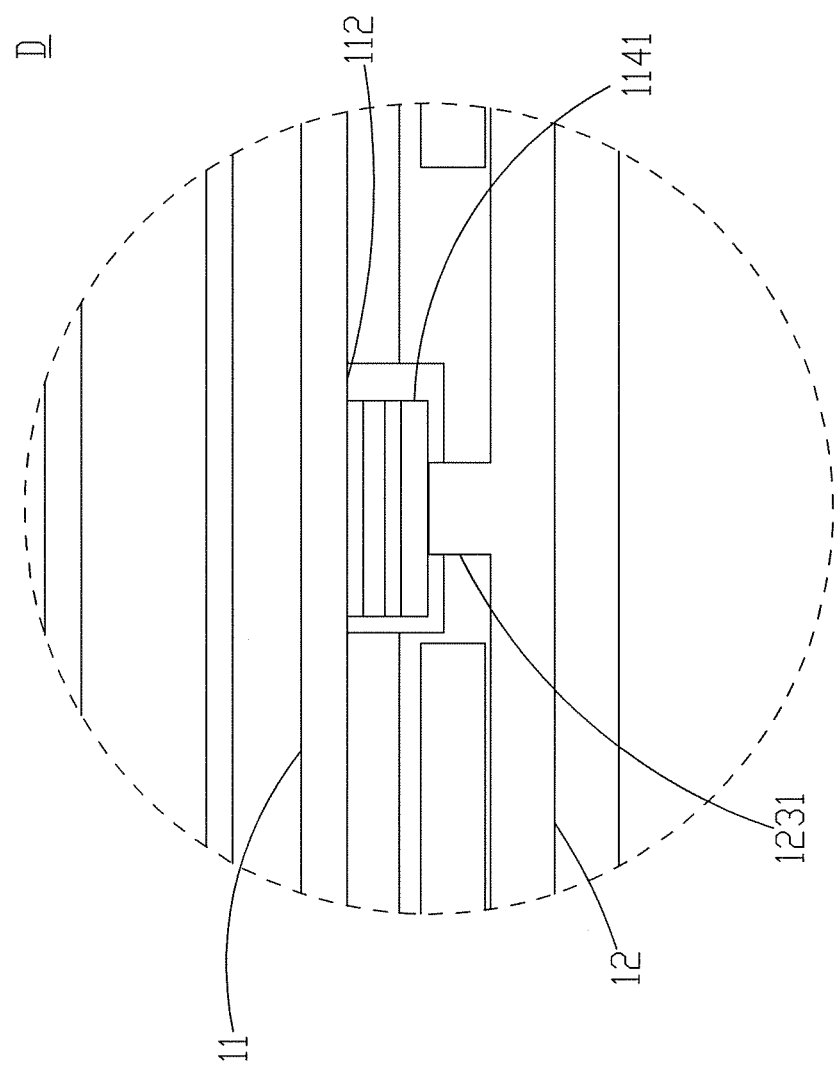
FIG. 8C shows a partially enlarged view of the D region in FIG. 8B according to the present disclosure.

Please refer to FIGS. 8A to 8C. As the key functions of the click pad 21 are shut down, the sliding lever 12 moves toward the first direction I; the two push pillars 1231 of the two positioning parts 123 moves to the two projecting parts 1141 of the two locking parts 114. The two push pillars 1231 push the two projecting parts 1141, respectively, as shown in FIG. 8C, for fixing the frame 11 and disabling its up-and-down movement. Accordingly, the click pad 21 cannot move up-and-down. The purpose of shutting down the key functions of the click pad 21 can be achieved.

Figure 9A:
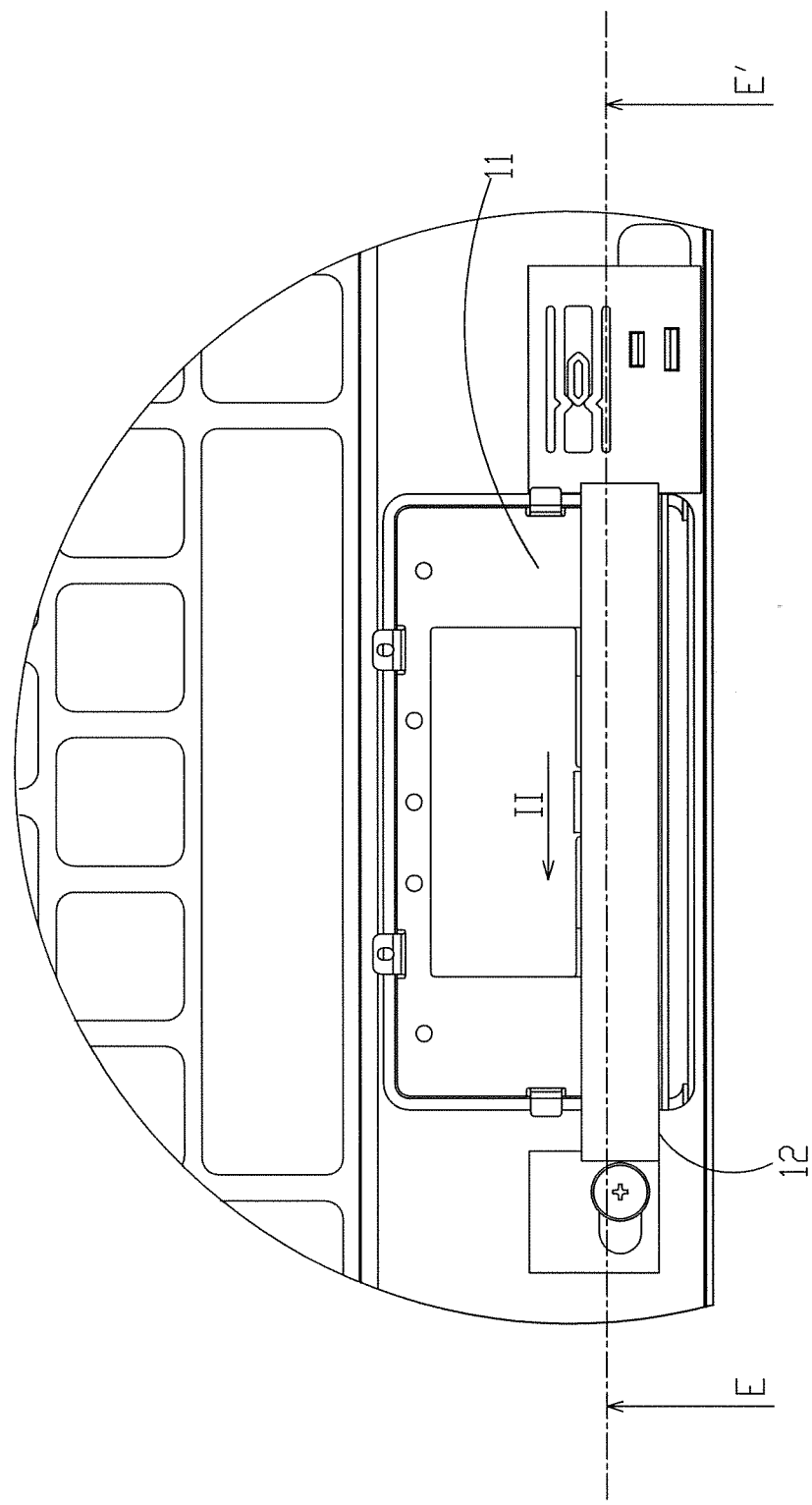
FIG. 9A shows another usage status diagram of the key control device according to the second embodiment of the present disclosure.
Figure 9B:
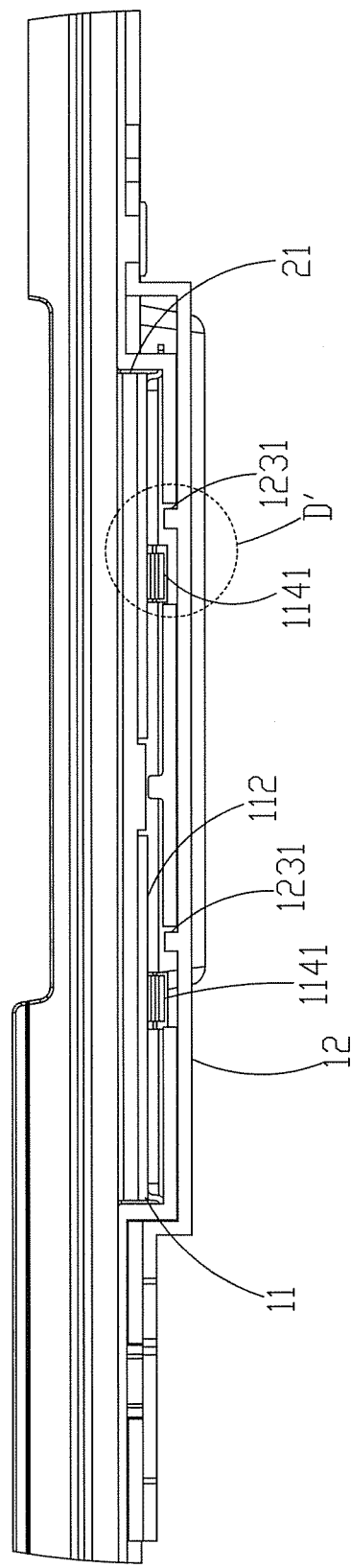
FIG. 9B shows a cross-sectional view along the EE' direction in FIG. 9A according to the present disclosure.
Figure 9C:
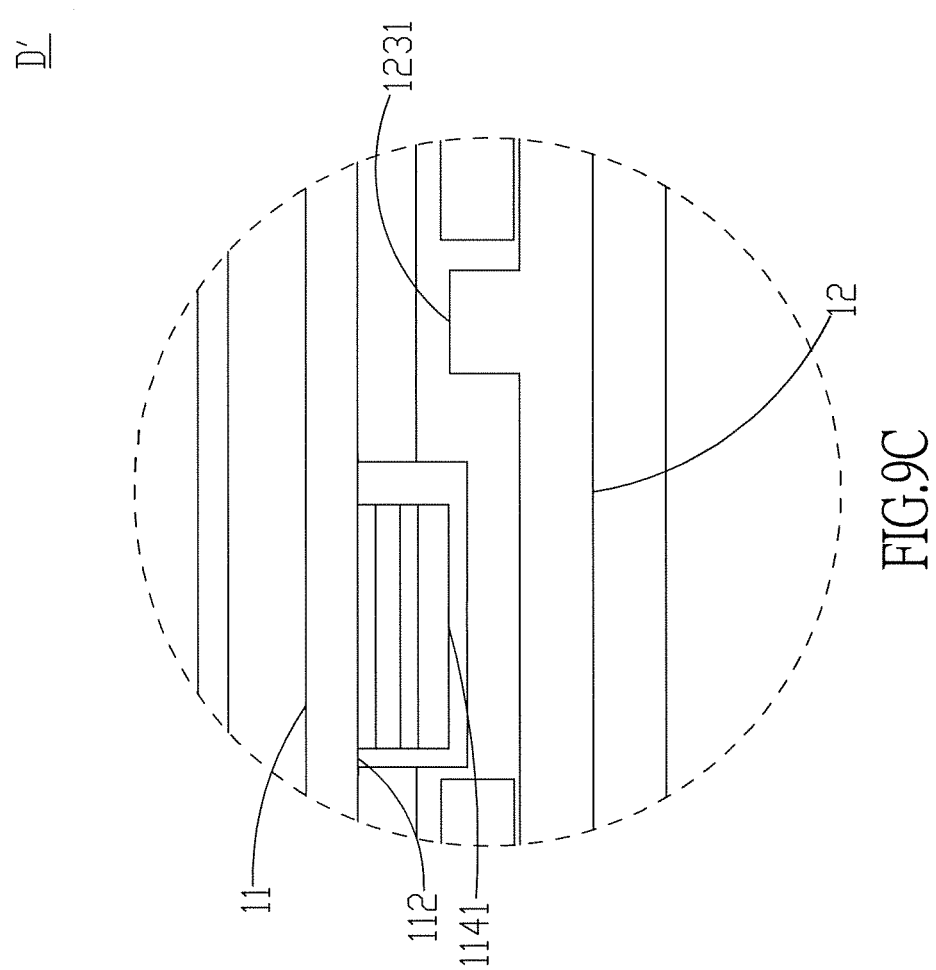
FIG. 9C shows a partially enlarged view of the D' region in FIG. 9B according to the present disclosure.

Please refer to FIGS. 9A to 9C. As the key functions of the click pad 21 are activated, the sliding lever 12 moves toward the second direction II; the two push pillars 1231 of the two positioning parts 123 escapes from the two projecting parts 1141 of the two locking parts 114. It means that the two push pillars 1231 do not push the two projecting parts 1141. The frame 11 can thereby move up-and-down. Accordingly, the click pad 21 can move up-and-down as well. The purpose of activating the key functions of the click pad 21 can be thus achieved.

To sum up, the present disclosure relates to a key control device for click pad. The key control device is disposed below the click pad. The key control device according to the present disclosure comprises the frame and the sliding lever. The frame is used for supporting the click pad. A user only needs to slide the sliding lever. By the operation of the plurality of positioning parts of the sliding lever and the plurality of locking parts of the frame, the click pad can be fixed or released and thus the activation and shutdown of the key functions of the click pad can be controlled for avoiding the user activating the key functions of the click pad falsely while using the touch functions thereof.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. A key control device for click pad, disposed in a keyboard housing of a notebook computer and corresponding to a click pad, and comprising:
   a frame, disposed in an opening of said keyboard housing, having a first surface and a second surface, said click pad disposed on said first surface and located on the outside of said keyboard housing, having a main body and a plurality of locking parts, and said plurality of locking parts disposed on the periphery of said main body; and
   a sliding lever, disposed on the inside of said keyboard housing, sliding on said second surface of said frame, and having a plurality of positioning parts corresponding to said plurality of locking parts for controlling the key functions of said click pad.

2. The key control device for click pad of claim 1, wherein said keyboard housing further comprises:
   a first limiting part, located on a first side of said opening, and a first end of said sliding lever disposed at said first limiting part; and
   a second limiting part, located on a second side of said opening and corresponding to said first limiting part, and a second end of said sliding lever disposed at said second limiting part.

3. The key control device for click pad of claim 2, wherein said first limiting part has a limiting pillar; said first end of said sliding lever has a limiting channel; and said limiting pillar is disposed in said limiting channel.

4. The key control device for click pad of claim 2, wherein said keyboard housing further includes a positioning pillar; said second end of said sliding lever further includes a third limiting part; and said positioning pillar is disposed at said third limiting part.

5. The key control device for click pad of claim 4, wherein said third limiting part includes a trench having a limiting part and a free part; and the sidewalls of said trench have at least a blocking part located between said limiting part and said free part.

6. The key control device for click pad of claim 5, wherein said third limiting part further includes two auxiliary trenches disposed on both sides of said trench and parallel to said trench.

7. The key control device for click pad of claim 2, wherein said sliding lever further comprises a pushing part disposed at said second limiting part and exposed to the outside of said keyboard housing.

8. The key control device for click pad of claim 7, wherein said second limiting part has at least a limiting trench and said pushing part is disposed in said limiting trench.

9. The key control device for click pad of claim 8, wherein said pushing part has at least a connecting projecting part passing through said limiting trench and disposed in at least a connecting hole of said second end of said sliding lever.

10. The key control device for click pad of claim 9, wherein said first limiting part has a limiting pillar; said first end of said sliding lever has a limiting channel; and said limiting pillar is disposed in said limiting channel.

11. The key control device for click pad of claim 9, wherein said keyboard housing further includes a positioning pillar; said second end of said sliding lever further includes a third limiting part; and said positioning pillar is disposed at said third limiting part.

12. The key control device for click pad of claim 11, wherein said third limiting part includes a trench having a limiting part and a free part; and the sidewalls of said trench have at least a blocking part located between said limiting part and said free part.

13. The key control device for click pad of claim 9, wherein said plurality of locking parts are disposed on both sides of said main body; said plurality of positioning parts are adjacent to said first end and said second end of said sliding lever, respectively; and said plurality of locking parts correspond to said plurality of positioning parts.

14. The key control device for click pad of claim 13, wherein said plurality of locking parts include a locking hole; each of said plurality of positioning parts is a hook; and said hook is disposed in said locking hole.

15. The key control device for click pad of claim 9, wherein said plurality of locking parts are disposed at the bottom of said main body and located between said sliding lever and said keyboard housing; said plurality of positioning parts are located between said first end and said second end of said sliding lever; and said plurality of locking parts correspond to said plurality of positioning parts.

16. The key control device for click pad of claim 15, wherein each of said plurality of locking parts is a projecting parts; said projecting part extends upwards from said second surface of said frame; each of said plurality of positioning parts is a push pillar; and said push pillar pushes said projecting pillar.

17. The key control device for click pad of claim 1, wherein said plurality of locking parts are disposed on both sides of said main body; said plurality of positioning parts are adjacent to said first end and said second end of said sliding lever, respectively; and said plurality of locking parts correspond to said plurality of positioning parts.

18. The key control device for click pad of claim 17, wherein said plurality of locking parts include a locking hole; each of said plurality of positioning parts is a hook; and said hook is disposed in said locking hole.

19. The key control device for click pad of claim 1, wherein said plurality of locking parts are disposed at the bottom of said main body and located between said sliding lever and said keyboard housing; said plurality of positioning parts are located between said first end and said second end of said sliding lever; and said plurality of locking parts correspond to said plurality of positioning parts.

20. The key control device for click pad of claim 19, wherein each of said plurality of locking parts is a projecting parts; said projecting part extends upwards from said second surface of said frame; each of said plurality of positioning parts is a push pillar; and said push pillar pushes said projecting pillar.

21. The key control device for click pad of claim 20, wherein said projecting part is a folded structure.

* * * * *